United States Patent [19]

Chambers et al.

[11] Patent Number: 4,467,268

[45] Date of Patent: Aug. 21, 1984

[54] DIGITALLY CONTROLLED POWER SUPPLY

[75] Inventors: Derek Chambers, Bayville, N.Y.; Dee Wang, Londonderry, N.H.

[73] Assignee: Raytheon Company, Lexington, Mass.

[21] Appl. No.: 519,217

[22] Filed: Aug. 3, 1983

Related U.S. Application Data

[63] Continuation of Ser. No. 364,118, Mar. 31, 1982, abandoned, which is a continuation of Ser. No. 145,288, Apr. 30, 1980, abandoned.

[51] Int. Cl.³ .............................................. G05F 1/00
[52] U.S. Cl. .................................... 323/222; 323/272; 363/124
[58] Field of Search ................ 323/222, 271–272, 323/282–290; 363/20–21, 41, 45–48, 124, 126

[56] References Cited

U.S. PATENT DOCUMENTS

| | | | |
|---|---|---|---|
| 3,571,697 | 3/1971 | Phillips | 323/222 |
| 3,913,002 | 10/1975 | Steigerwald et al. | 363/124 X |
| 4,017,745 | 4/1977 | McMahon | 323/282 |
| 4,074,344 | 2/1978 | Pitel | 363/48 X |
| 4,238,710 | 12/1980 | Nelson | 323/222 X |

Primary Examiner—Peter S. Wong
Attorney, Agent, or Firm—William R. Clark; Joseph D. Pannone

[57] ABSTRACT

A high power factor AC to DC power supply having a high frequency pulse producing circuit comprising an inductor supplied with rectified raw AC power through a semiconductor switch which provides dynamic power factor correction by maintaining the width of the on-times of the switch substantially constant throughout each cycle of the input AC power. The peak energy stored in the inductor during the on-times are a function of the amplitude of the instantaneous voltage of said rectified AC power, so that each time the switch is turned off, the output pulse of current supplied to the load by the inductor has a time duration which is a direct function of the instantaneous voltage value of the rectified AC power. The output load has a filter whose time constant is greater than a cycle of said rectified AC power, and the average on-time of said switch is varied over a number of cycles of said AC power to regulate the output voltage of said supply.

4 Claims, 2 Drawing Figures

DIGITALLY CONTROLLED POWER SUPPLY

This application is a continuation of application Ser. No. 364,118 filed Mar. 31, 1982, now abandoned, which is a continuation of application Ser. No. 145,288 filed Apr. 31, 1980, now abandoned.

BACKGROUND OF THE INVENTION

The power factor of commercial power supplies of several hundred watts is usually substantially less than unity for reasons of economy. This is also true for switching power supplies because the input AC power is first rectified and filtered in conventional circuitry to produce a DC voltage whose minimum is above a predetermined level and this introduces substantial power factor reduction. This low power factor in power supplies energized by line voltage results mainly from the pulsed current wave form that is drawn from the AC line.

SUMMARY OF THE INVENTION

This invention provides for a switching power supply in which an alternating current input supplies a pulser with rectified power which is substantially unfiltered at the frequency of said alternating current. The pulser produces output power pulses whose duration is a direct function of the instantaneous amplitude of said rectified AC power. More specifically, an input AC supply of, for example, 60 Hz. is rectified, but not filtered at 60 Hz., to supply a chopping circuit which produces pulses at a substantially higher rate than the input AC supply frequency. The average current wave shape drawn from the AC line is made to approach that of a resistive load. A pulser circuit chops the rectified AC line currrent into pulses, for example, of 25,000 to 50,000 pulses per second, with the output pulses having a higher voltage amplitude than that of the AC line. More specifically, the pulser has an inductor and a semiconductor switch. The pulser stores energy in the inductor when the switch is on and discharges the energy through a rectifier when the switch is turned off. The on/off ratio of the semiconductor switch is substantially constant throughout a cycle of the AC line frequency.

In accordance with this invention, the on-time of the pulser switch is varied as a function of output power supply voltage to control or regulate the level of the output power supply voltage. In addition, ripple cancellation in the feed-back circuit of the power supply keeps such ripple from affecting the power factor improvement. Such ripple cancellation is achieved by inverting the ripple in feed-back signal and adding the inverted ripple signal to the original feed-back signal to produce a control signal without ripple.

BRIEF DESCRIPTION OF THE DRAWINGS

Other and further objects and advantages of the invention will be apparent as the description thereof progresses, reference being had to the accompanying drawings wherein.

DESCRIPTION OF PREFERRED EMBODIMENTS

Figure 1:
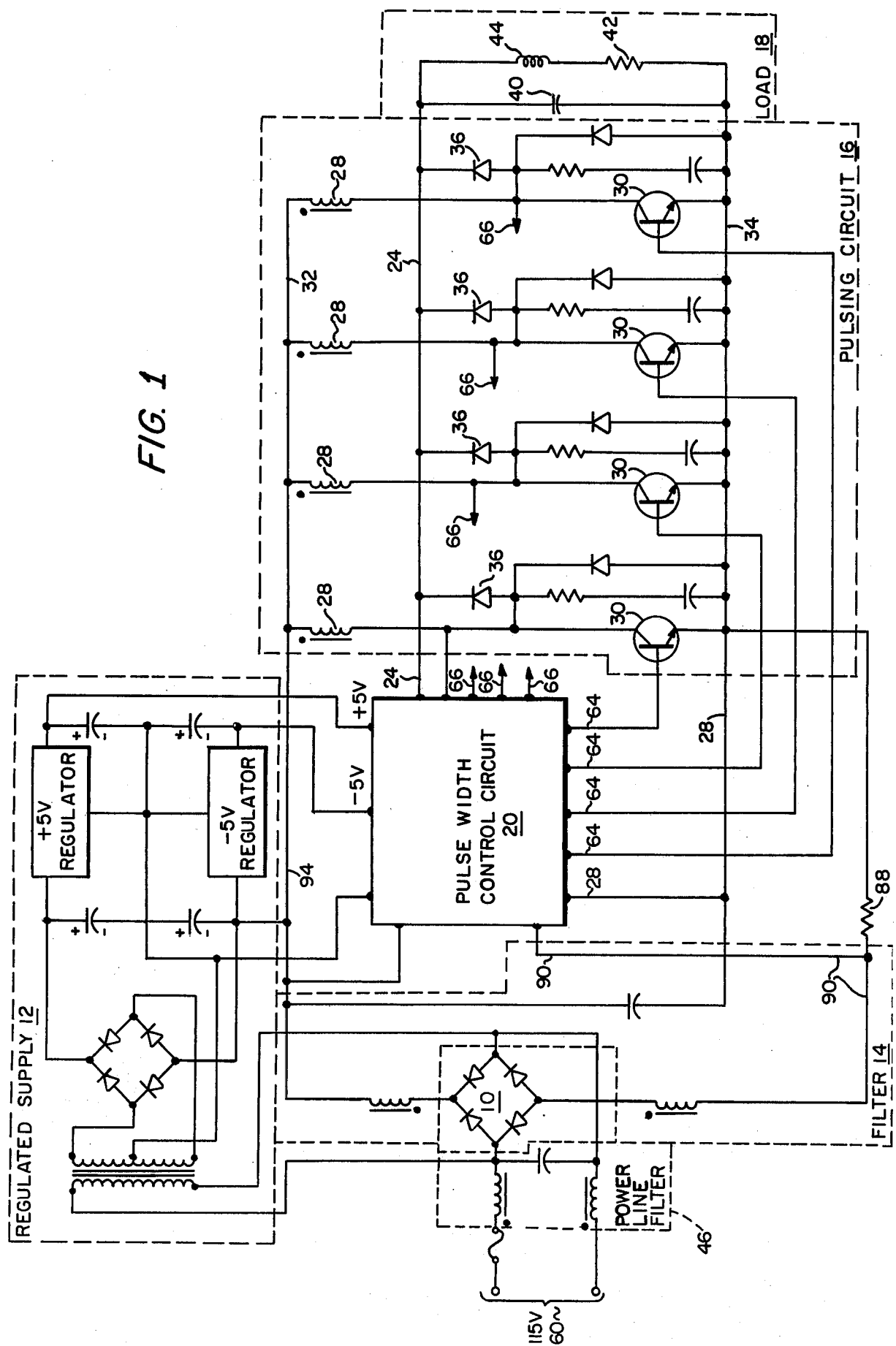
FIG. 1 illustrates a circuit diagram of a power supply embodying the invention.

Referring now to FIG. 1, there is provided a full wave rectifier 10 supplied by conventional 60 cycle alternating current 115 volt power. The output of circuit 10 is pulsed at 120 hertz with each of the pulses having a voltage wave form which is substantially a half of a sinusoidal wave form. A regulated voltage DC supply 12 having, for example, voltages of plus and minus five volts is also provided with input power from the same 60 cycle input as the supply 10.

The pulsed DC from rectifier 10 is supplied through a high frequency filter 14 to a pulsing circuit 16 which supplies DC pulses of varying pulse widths and a constant repetition rate to an output load 18. The pulse repetition rate of the pulses from pulser 18 may be, for example, in the supersonic range of, for example, 15–200 kilohertz with the example illustrated herein being 40 kilohertz.

The pulser 16 is driven by a pulse width control circuit 20 which supplys control pulses at a frequency of the output power pulses of pulsing circuit 16. The duration of such power pulses varies directly as a function of the current supplied from power supply 10 and filtered by filter 14.

The width of the control pulses which pulsing circuit 16 receives from the pulse width control circuit 20 is varied as an inverse function of the magnitude of the output voltage across load 18. This control pulse width is, however, maintained substantially constant over each cycle of the input supply to rectifier 10. The repetition rate of the control pulses is also preferably maintained substantially constant at a superaudible frequency such as, for example, 40 kilohertz.

Figure 2:
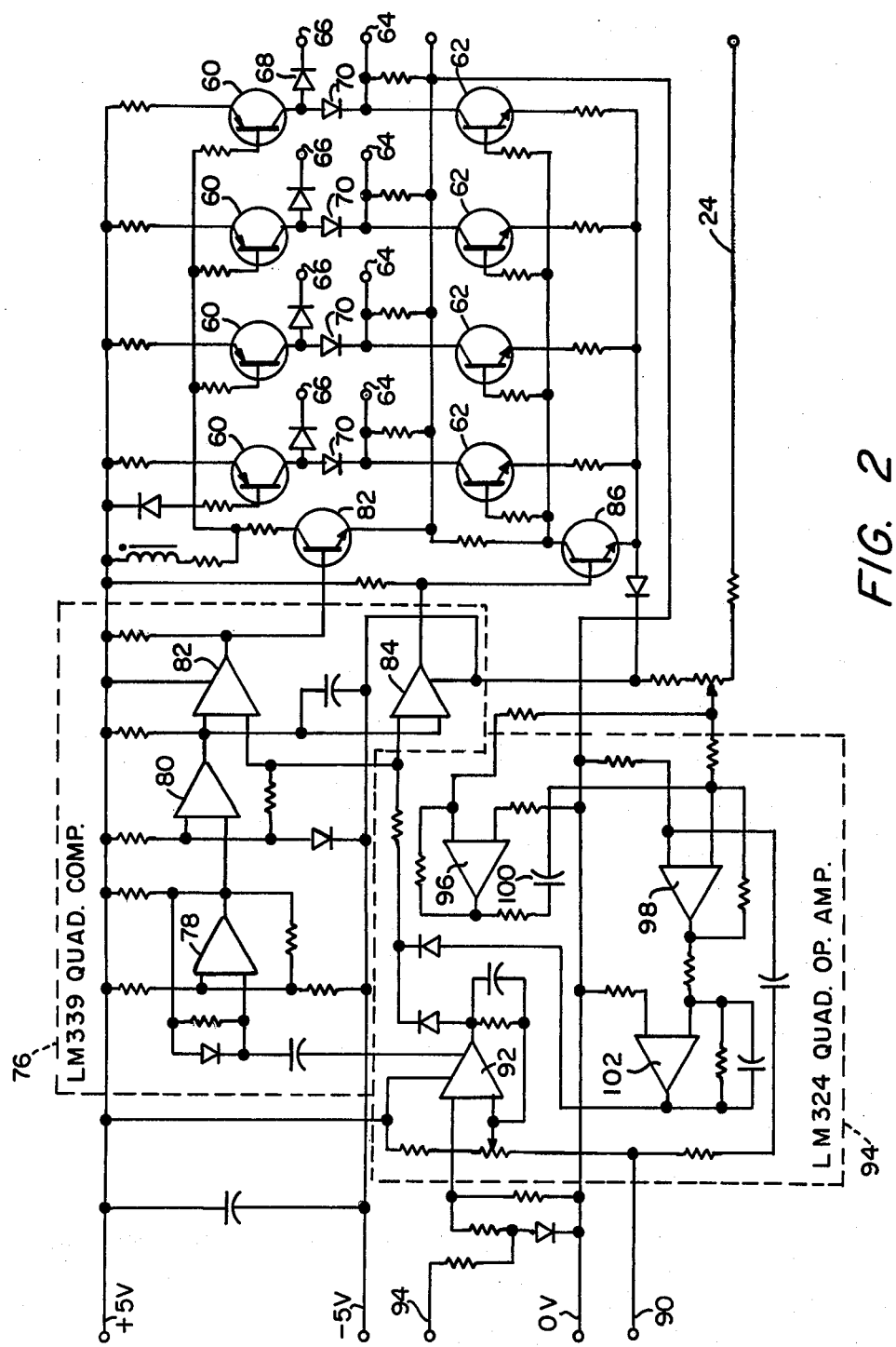
FIG. 2 illustrates circuit details of the pulse width control illustrated in FIG. 1.

As shown in FIG. 2, the drive pulses supplied to pulse circuit 16 are formed in a control pulse driver circuit 22 described in greater detail hereinafter. It should be clearly understood, however, that any desired circuits could be used for the pulsing circuit 16 and the pulse drive circuit.

The 120 Hz. ripple on the output of pulser 16 appears on output bus 24. This ripple is preferably removed from the feed-back control signal because it is not in phase with the rectified line voltage and would produce a phase shift in input current relative to the line voltage wave form. Such ripple cancellation is achieved in power width control circuit 20 by inverting the feed-back voltage and summing the ripple component of the inverted signal with the original feed-back signal on bus 24. The resultant signal is then used to control the width of the control pulses as an accurate function of the output voltage on bus 24 averaged over a time period which is of the order of magnitude of a cycle of the 60 cycle input.

Pulsing circuit 16 has a plurality of storage inductors 28 connected respectively in series with separate semiconductor switches 30 across the rectified output of rectifier 10. Switches 30 are NPN transistors whose bases are driven by the control pulses from control circuit 20. This switching circuit is an up-chopper in which energy is stored in inductors 28 when switches 30 are closed and is transferred to the load 18 when switches 30 are opened. A capacitor 40 in load 18 is a large storage capacitor that provides an energy buffer between the source and the load. When switches 30 are closed, a capacitor 40 provides energy to the load while energy is restored in inductors 28 and is recharged from inductors 28 when the switches 30 are opened.

The energy stored in the inductors 28 while the switches 30 are closed is equal to $\frac{1}{2} LI^2$ where I is the peak current through each inductor 28 and L is the total inductance value of all the inductors 28 in Henrys. The current peaks occur at the ends of the closed periods of switches 30 and vary directly with the voltage applied across inductors 28 through switches 30 from busses 32 and 34 which are supplied with rectifier 10 through high frequency filter 14. The current peaks, thus, vary directly with the amplitude wave form of the rectified AC power on busses 32 and 34. When switches 30 open, the current flows through diodes 36 to load 18 through output bus 24 driven by the combination of stored energy in inductors 28 and the rectified power on bus 32.

With each of the inductors 28 having a value of, for example, 150-200 microhenrys, conventional transistors, such as type 2N6547, may be used for transistors 30 to supply an average power to load 18 of 800 watts from an input power voltage of 115 V RMS 60 Hz. The input power factor which can be economically achieved with this system is within a few percent of unity The capacitor 40 across the output at busses 24 and 34, which is recharged by the current pulses from inductors 28, preferably has a value which permits a few percent ripple in the output. The value of capacitor 40 may be, for example, 500 microfarads. The load 18 may have a resistive component 42 and an inductive component 44 or any other desired characteristic without affecting the power factor. Input power line surges are preferably filtered by a conventional power line filter 46, and thus the output filter can be of a sufficiently low value for the voltage on bus 24 to be fed back to control circuit 20 to control the width of the pulses generated therein.

Filter 14 filters substantially all frequencies in the range above 1000 Hz. so that pulsing power from pulser 16 does not pass through rectifier 10.

Referring now to FIG. 2, there is shown an example of a power width control circuit 20 which may be used to drive pulser 18. The bases of semiconductor transistor switches 30 of FIG. 1 are driven by the outputs from a series connected pair of transistors 60 and 62 in FIG. 2 through terminals 64 connected to the collectors of transistors 62. There are four identical transistor pairs 60 and 62 driving four identical transistors 30 of pulser 16 in FIG. 1. The collector terminals 66 of NPN transistors 30 are connected to their emitters through diodes 68 and 70 to prevent the emitter terminals from being driven positive with respect to collector terminals 66 by more than two diode drops on one volt.

The base input drive to transistors 60 is supplied from the output of a transistor 72 driven by an operational amplifier 82 in an integrated circuit 76. Integrated circuit 76 has four operational amplifiers connected in a conventional manner with external components such that amplifier 78 is a 40 kilohertz oscillator, amplifier 80 is a ramp generator, amplifier 82 is a circuit controlling the turn-on time of transistors 30 by driving transistor 72 on, and amplifier 84 controls the turn-off time of transistors 30 by driving a transistor 86 on which drives the bases of transistor 62 on, thereby, driving the base terminals of transistors 30 negative.

Current will flow through a current sensing resistor 88 to bus 34 from bus 90 to provide a waveform of current through transistors 30, which is sensed by an amplifier 92 in a second integrated circuit 74. A second input to amplifier 92 senses the rectified AC voltage on bus 94 which is connected to inductors 28. The output of amplifier 92 drives amplifier 84 to limit the on-time of transistors 30 if a current over-load occurs. Voltages of volts, plus 5 volts, and minus 5 volts are supplied by regulated supply 12.

During operation, the bus 24 will have a 120 Hz. ripple thereon dependent, among other things, on the size of a filter condenser 40 connected across the output in load 18. The power absorbing portion of the load is indicated, for purposes of illustration, by the resistor 42 and possible inductive reactance by inductor 44. It should be clearly understood that this power absorbing load could have a reactive component which is either capacitive, such as a fluorescent lamp, or inductive, such as a motor.

If, for example, the size of the capacitor 40 is 500 microfarads, with the voltage across the load being 280 volts, the substantial 120 Hz. ripple component which varies with the waveform output from power supply 10 will appear in the voltage regulating feedback circuit on bus 24. This ripple, which would affect power factor, may be largely removed by supplying the voltage on bus 24 to the input of an inverting amplifier 96 and to a summing amplifier 98. The output of inverting amplifier 96 is then fed through a condenser 100 to the input of amplifier 98 where it cancels the ripple on bus 24 so that the output of the amplifier 98 varies substantially as a function of the DC variation on bus 24 without the 120 Hz. cycle ripple component. The output of amplifier 98 drives an amplifier 102 which drives the second input of amplifier 84, along with the output of amplifier 92, to reduce the width of the pulses supplied to transistor terminals 64 when the average DC voltage on bus 24 exceeds a predetermined level, such as 280 V. Amplifiers 96, 98, and 102 are also part of integrated circuit 94, and have conventional external circuitry to perform the functions described above.

This completes the description of the embodiments of the invention disclosed herein. However, many modifications thereof will be apparent to persons skilled in the art without departing from the spirit and scope of the invention. For example, input power sources other than 115 V 60 Hz. AC could be used and other output loads could be driven with voltages or currents. Accordingly, it is intended that this invention be not limited by the particular details of the embodiments of the invention described herein except as defined by the appended claims.

What is claimed is:

1. A power supply comprising:
    means supplied from a source of alternating current power for providing rectified power which is substantially unfiltered at the frequency of said alternating current power;
    means supplied by said rectified power for producing pulses of power, said producing means comprising a switch and means for controlling said switch, said producing means storing energy when said switch is in a first state and producing one of said power pulses when said controlling means switches said switch to a second state, said controlling means switching said switch at a frequency substantially greater than the frequency of said alternating current source;
    the voltage amplitudes of said pulses being greater than the voltage amplitude of said alternating current power; and said controlling means controlling said switch wherein said frequency and the duty cycle between said first and second states are substantially constant over a cycle of said alternating current.

2. The power supply in accordance with claim 1 wherein:
said rectified power providing means comprises filter means for substantially preventing a component of said power pulses from being coupled into said AC source.

3. The power supply in accordance with claim 1 wherein:
said pulse producing means comprises an inductor in series with said switch to said rectified power providing means, said switch comprising a semiconductor device.

4. The power supply in accordance with claim 2 wherein:
said filter means comprises inductive means and capacitive means for substantially reducing the power of said component of said power pulses coupled into said AC supply.

* * * * *